(12) United States Patent
Hermanowski et al.

(10) Patent No.: US 11,977,462 B2
(45) Date of Patent: May 7, 2024

(54) DIGITAL HYBRID CLOUD COMPUTING INFRASTRUCTURE FOR IMPLEMENTING AN AUTOMATIC ACTIVE-PASSIVE DISASTER RECOVERY

(71) Applicant: AGARIK SAS, Bezons (FR)

(72) Inventors: Krzysztof Hermanowski, Bydgoszcz (PL); Piotr Lewandowski, Warsaw (PL); Robert Kaminski, Lochowo (PL)

(73) Assignee: AGARIK SAS, Bezons (FR)

( * ) Notice: Subject to any disclaimer, the term of this patent is extended or adjusted under 35 U.S.C. 154(b) by 52 days.

(21) Appl. No.: 17/699,022

(22) Filed: Mar. 18, 2022

(65) Prior Publication Data
US 2022/0300385 A1 Sep. 22, 2022

(30) Foreign Application Priority Data
Mar. 18, 2021 (EP) .................... 21163350

(51) Int. Cl.
*G06F 11/20* (2006.01)
(52) U.S. Cl.
CPC .................. *G06F 11/203* (2013.01)
(58) Field of Classification Search
CPC . G06F 11/2023; G06F 11/203; G06F 11/2033
See application file for complete search history.

(56) References Cited

U.S. PATENT DOCUMENTS

| 9,772,916 B2 * | 9/2017 | Rangasamy | ........ | G06F 11/2023 |
| 10,346,252 B1 * | 7/2019 | Gould | ................. | G06F 11/1451 |

| 2016/0062858 A1 | 3/2016 | Gallagher et al. |
| 2019/0370132 A1 | 12/2019 | Salapura et al. |
| 2020/0136825 A1 | 4/2020 | Gupta et al. |

OTHER PUBLICATIONS

European Search Report issued in EP21163350.8, dated Sep. 21, 2021 (10 pages).
Ikwan, et al., "Architecture of scalable backup service for private cloud", 2013 IEEE Conference on Open Systems (ICOS), IEEE, Dec. 2, 2013, pp. 174-179.
Anonymous: "Proxy server—Wikipedia", Apr. 21, 2013 (12 pages).

* cited by examiner

*Primary Examiner* — Joseph R Kudirka
(74) *Attorney, Agent, or Firm* — ARC IP Law, PC; Joseph J. Mayo

(57) ABSTRACT

A computing infrastructure that includes one active site and one passive site. Each site includes a private cloud connected to a public cloud, at least one virtual machine, a replication module to replicate each protected virtual machine in the other site, and at least one site recovery manager module paired with the corresponding site recovery manager module in the other site. The at least one site recovery manager module is configured to synchronize disaster recovery configuration information including at least one group of protected virtual machines and at least one recovery plan via the pairing, and to execute each recovery plan in case of disaster. Each site also includes a cloud orchestrator configured to update disaster recovery configuration information in each site recovery manager module on request.

10 Claims, 4 Drawing Sheets

DIGITAL HYBRID CLOUD COMPUTING INFRASTRUCTURE FOR IMPLEMENTING AN AUTOMATIC ACTIVE-PASSIVE DISASTER RECOVERY

TECHNICAL FIELD

The technical field of the invention is the one of digital hybrid cloud computing infrastructures, and especially the one of digital hybrid cloud computing infrastructures implementing an automatic active-passive disaster recovery.

At least one embodiment of the invention concerns a digital hybrid cloud computing infrastructure and in particular a digital hybrid cloud computing infrastructure for implementing an active-passive disaster recovery. At least one embodiment of the invention also relates to a method for configuring disaster recovery in such a computing infrastructure.

BACKGROUND OF THE INVENTION

Disaster recovery allows protection and recovery of vital data hosted in a computing infrastructure in the event of the occurrence of a disaster in the computing infrastructure.

It exists two types of disaster recovery for a computing infrastructure, both based on the replication of data between two sites hosting the computing infrastructure: the first called active-active disaster recovery consists in using two active sites, that is two sites having virtual machines running continuously, and the second called active-passive disaster recovery consists in using one active site and one passive site, the passive site having a reduced number of virtual machines running only in the event of a failure of the active site. In both cases, it is ensured that at least one site is running at each time.

However, an automatic active-passive disaster recovery does not currently exist for a digital hybrid cloud computing infrastructure in which the computing infrastructure comprises a private cloud manageable from a public cloud to which it is connected. Actually, in the digital hybrid cloud products available on the market, such as VMware products, only an automatic active-active disaster recovery is implemented. A manual active-passive disaster recovery could be set up but it would not be compatible with the concept of end-to-end automation around which the digital hybrid cloud products are designed. Furthermore, prior art configurations are deployed and configured manually giving the non-technical personnel no chance to operate it. Prior art configurations also require engineers to be trained on the configuration and management processes.

SUMMARY OF THE INVENTION

An object of the invention is to provide a digital hybrid cloud computing infrastructure implementing an automatic active-passive disaster recovery, that can be deployed and configured automatically with a minimal number of manual steps.

To this end, according to a first aspect of the invention, it is provided a computing infrastructure for implementing an automatic active-passive disaster recovery, comprising one active site and one passive site, each site comprising:
- a private cloud connected via an external communication network to a public cloud and to the private cloud of the other site;
- at least one workload domain comprising:
  - at least one virtual machine associated with computing and storage resources, configured to host workloads, each virtual machine having a placeholder virtual machine in the other site;
  - a replication module configured to replicate the storage resources associated with each virtual machine comprised in a group of protected virtual machines in the storage resources associated with the corresponding placeholder virtual machine;
- a management domain configured to control each workload domain, comprising:
  - one server management module per workload domain, configured to control each virtual machine comprised in the workload domain;
  - one site recovery manager module per workload domain, paired with the corresponding site recovery manager module in the other site, configured to synchronize disaster recovery configuration information comprising at least one group of protected virtual machines and at least one recovery plan to recover each virtual machine comprised in the group of protected virtual machines via the pairing, and to execute each recovery plan in case of disaster;
  - a cloud orchestrator configured to, upon receipt of a disaster recovery configuration request for updating a group of disaster recovery configuration information, update each site recovery manager module hosting disaster recovery configuration information comprised in the group of disaster recovery configuration information;
  - a cloud proxy configured to receive disaster recovery configuration requests from the public cloud via the external communication network and to send the received requests to the cloud orchestrator;

each virtual machine in the active site being running as long as no disaster occurs, each virtual machine comprised in the group of protected virtual machines being running only in case of disaster in the passive site.

Thanks to the invention, in case of the occurrence of a disaster in the active site, the site recovery manager modules automatically execute recovery plans to recover the protected virtual machines of the active site in the placeholder virtual machines in the passive site. The recovery is possible thanks to the replication of the storage resources of the protected virtual machines between both sites by the replication modules.

The protected virtual machines and the recovery plans can be configured remotely by sending disaster recovery configuration requests through the public cloud and allow to give flexibility to the orchestration of the recovery.

The received disaster recovery configuration requests are processed in a centralized way by the cloud orchestrator which automatically configures the site recovery manager modules concerned by the requests. Each site recovery manager modules of the other site corresponding to an updated site recovery manager module is also automatically configured via the pairing. The cloud proxy acts as an intermediary between the public cloud and the cloud orchestrator for the disaster recovery configuration.

The computing infrastructure according to the invention thus allows the implementation of an automatic active-passive disaster recovery manageable from a public cloud.

Apart from the characteristics mentioned above in the previous paragraph, the computing infrastructure according to the first aspect of the invention may have one or several complementary characteristics among the following characteristics considered individually or in any technically possible combinations.

According to an embodiment, the public cloud and the private cloud of each site are connected via an Internet connection provided by the external communication network.

According to an embodiment compatible with the previous embodiment, the computing infrastructure according to the invention further comprises an internal management communication network configured to allow communication within the management domain and between the management domain and each workload domain.

According to an embodiment compatible with the previous embodiments, the computing infrastructure according to the invention further comprises an internal replication communication network configured to allow transmission of the replicated storage resources to the other site.

Having one internal communication network dedicated to the management traffic and one internal communication dedicated to the replication traffic allows to avoid collision between both traffics.

According to an embodiment compatible with the previous embodiments, the management domain further comprises a management domain storage management module configured to manage the computing and storage resources of the management domain.

According to an embodiment compatible with the previous embodiments, each workload domain further comprises a workload domain storage management module configured to manage the computing and storage resources associated with each virtual machine comprised in the workload domains.

According to an embodiment compatible with the previous embodiments, the disaster recovery configuration information comprises at least one recovery point objective and/or at least one recovery time objective for each group of protected virtual machines. This allows to give even more flexibility to the orchestration of the recovery.

At least one embodiment of the invention is deployed and configured automatically with minimal number of manual steps. A custom code in Ansible is utilized specifically for that purpose.

According to a second aspect of the invention, it is provided a method for configuring disaster recovery in the computing infrastructure according to the invention, comprising the following steps:
  Sending by a user of the computing infrastructure, of a disaster recovery configuration request to at least one of the site via the public cloud, the disaster recovery configuration request comprising a group of disaster recovery configuration information to update;
  Reception by the cloud proxy of the site and sending to the cloud orchestrator of the disaster recovery configuration request;
  Reception by the cloud orchestrator of the site, of the disaster recovery configuration request from the cloud proxy;
  Update by the cloud orchestrator of the site, of each site recovery manager module of the site hosting disaster recovery configuration information comprised in the group of disaster recovery configuration information;
  For each updated site recovery manager module of the site, update of the corresponding site recovery manager module in the other site via the pairing.

The invention and its various applications will be better understood by reading the following description and examining the accompanying figures.

BRIEF DESCRIPTION OF THE FIGURES

The figures are presented for information purposes only and in no way limit the invention.

DETAILED DESCRIPTION OF THE PREFERRED EMBODIMENT

Some embodiments of devices and methods in accordance with embodiments of the invention are now described, by way of example only, and with reference to the accompanying drawings. The description is to be regarded as illustrative in nature and not as restrictive.

A first aspect of the invention relates to a digital hybrid cloud computing infrastructure.

By "digital hybrid cloud computing infrastructure" is meant a computing infrastructure comprising a private cloud manageable from a public cloud to which the private cloud is connected.

The computing infrastructure according to the invention allows the implementation of an automatic active-passive disaster recovery.

The automatic active-passive disaster recovery is for example implemented using VMware products. The implementation covers deployment, configuration, and use.

Figure 1:
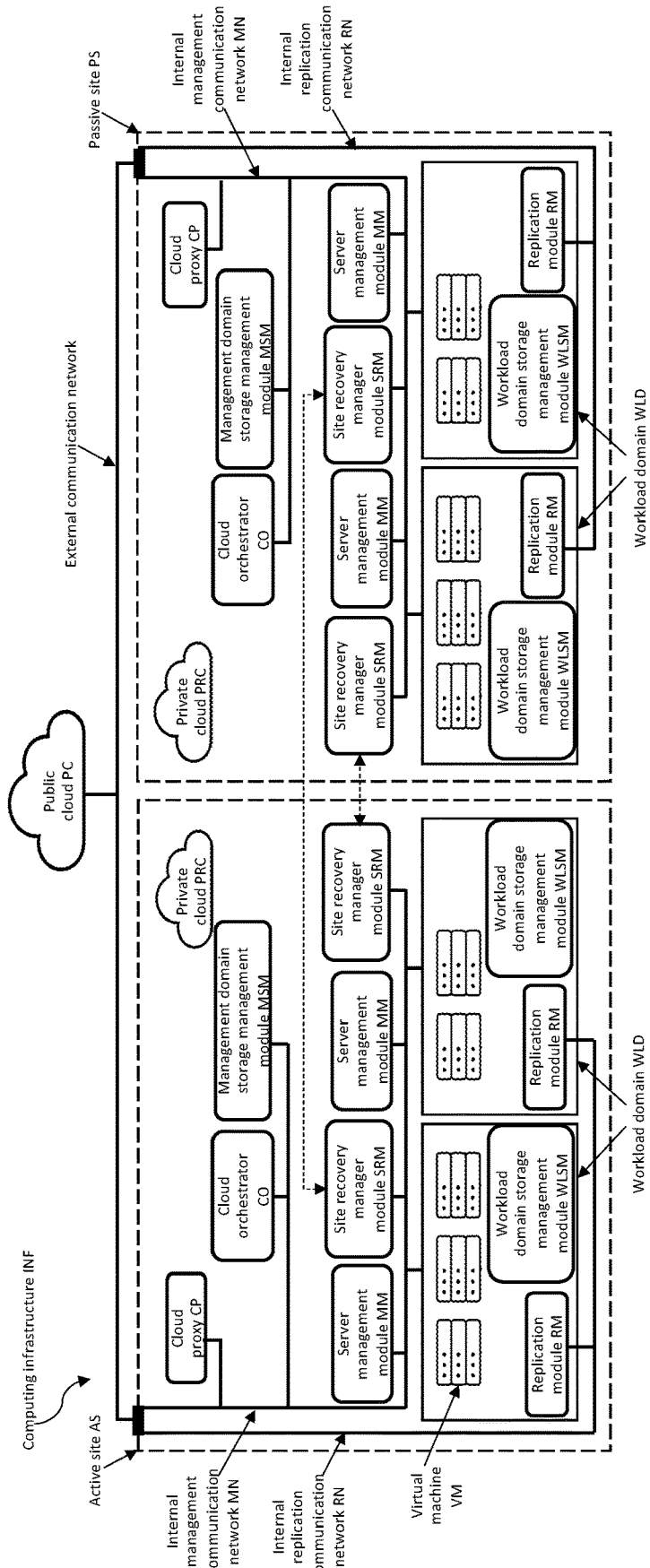
FIG. 1 schematically represents a computing infrastructure according to the invention.

As illustrated in FIG. 1, the computing infrastructure INF according to the invention comprises one active site AS and one passive site PS, each being on premises.

As shown in FIG. 1, the active site AS and the passive site PS have a same architecture, the architecture of the active site AS and the architecture of the passive site PS being represented in mirror to simplify the figure.

Each site AS, PS comprises a private cloud PRC connected to a public cloud PC via an external communication network CN.

Each private cloud PRC is manageable from the public cloud PC, that is that a user of the computing infrastructure INF can manage the computing infrastructure INF remotely sending requests through the public cloud PC.

For these reasons, the computing infrastructure INF according to the invention can be qualified as digital hybrid cloud computing infrastructure.

The public cloud PC is for example a vRealize® Automation™ cloud from VMware.

The public cloud PC and each private cloud PRC of each site can be connected via an Internet connection provided by the external communication network CN.

The private cloud PRC of each site AS, PS is also connected to the private cloud PRC of the other site AS, PS via the external communication network CN.

Each site AS, PS further comprises at least one workload domain WLD.

In FIG. 1, each site AS, PS comprises a first workload domain WLD and a second workload domain WLD.

By "domain" is meant a set of computers in a computing infrastructure grouped together by the administrator and whose access rights are managed by a single database.

Each workload domain WLD comprises at least one virtual machine monitor, also called hypervisor, on which at least one virtual machine VM configured to host workloads is running. Preferably, at least four virtual machines are running on each physical machine.

By "virtual machine" is meant a separate, self-contained and complete IT environment that is virtually created from a dynamic allocation of software or hardware resources available on one or more servers.

Each virtual machine VM is associated with computing and storage resources.

In FIG. 1, the first workload domain WLD comprises three virtual machines VM and the second workload domain WLD comprises two virtual machines VM.

Although the first workload domain WLD comprises a number of virtual machines VM different from the number of virtual machines VM in the second workload domain WLD in FIG. 1, the first workload domain WLD could comprise the same number of virtual machines VM as the second workload domain WLD.

As the active site AS and the passive site PS have a same architecture, each virtual machine VM in one of the sites AS, PS has a corresponding virtual machine VM in the other site AS, PS, in which the virtual machine VM can be recovered, called placeholder virtual machine VM. The placeholder virtual machine will remain in a powered off state until a failover is executed.

Each workload domain WLD further comprises a replication module RM configured to replicate the storage resources associated with each protected virtual machine VM comprised in the workload domain WLD in the storage resources of the corresponding placeholder virtual machine VM.

By "protected virtual machine" is meant a virtual machine that must be recovered in case of disaster.

The replication module RM is for example a vSphere® Replication™ module from VMware.

In the active site AS, each virtual machine VM is running as long as no disaster occurs. In the passive site PS, only protected virtual machines VM are running and only in case of disaster.

Each workload domain WLD can further comprise a workload domain storage management module WLSM configured to manage the computing and storage resources associated with each virtual machine VM comprised in the workload domain WLD.

The workload domain storage management module WLSM is for example a VMware vSAN™ module.

Each site AS, PS further comprises a management domain configured to control each workload domain WLD.

The management domain comprises one server management module MM per workload domain WLD.

In FIG. 1, the management domain of each site AS, PS comprises a first server management module MM for the first workload domain WLD and a second server management module MM for the second workload domain WLD.

The server management module MM is configured to control each virtual machine VM comprised in the workload domain WLD with which the server management module MM is associated.

The server management module MM is for example a vCenter Server® from VMware.

The management domain further comprises one site recovery manager module SRM per workload domain WLD.

In FIG. 1, the management domain of each site AS, PS comprises a first site recovery manager module SRM for the first workload domain WLD and a second site recovery manager module SRM for the second workload domain WLD.

The site recovery manager module SRM comprises disaster recovery configuration information relative to the virtual machines comprised in the workload domain WLD.

The disaster recovery configuration information comprises at least one group of protected virtual machines VM and at least one recovery plan to recover each virtual machine VM comprised in the group of protected virtual machines VM.

A group of protected virtual machines VM comprises at least one virtual machine VM to recover in case of disaster. For each virtual machine VM, a mapping between the active site AS and the Passive Site PS is needed for:
  A resource pool (cluster),
  All connected networks,
  Folders (all backup policy folders, backup policies should match between sites).

When a Virtual Machine is protected and a failover is executed, the site recovery module SRM will use these mapping to configure the virtual machine VM in the recovery passive site PS.

By "recovery plan" is meant a series of configured steps that must be performed to recover at least one protected virtual machine.

The site recovery manager module SRM is configured to execute each recovery plan comprised in the disaster recovery configuration information in case of disaster.

The disaster recovery configuration information can also comprise at least one recovery point objective and/or at least one recovery time objective for each group of protected virtual machines VM.

By "recovery point objective" is meant the point in time when a virtual machine can be recovered after the occurrence of a disaster, that is the duration between the most recent date of the virtual machine data that will be used to recover the virtual machine and the occurrence of the disaster. If the RPO is 1 hour then this means a virtual machine VM can be recovered up to 60 minutes prior to the disaster.

To determine the bandwidth that the replication module RM requires to replicate efficiently, the average data change rate within an RPO period should be computed and divided by the link speed. Then the following 3 steps can be performed:
  Identify the average data change rate within the RPO by calculating the average change rate over a longer period, then dividing it by the RPO,
  Calculate how much traffic the data change rate generate in each RPO period,
  Measure the traffic against the link speed.

As an example, a data change rate of 100 GB requires approximately 200 hours to replicate on a T1 network, 30 hours to replicate on a 10 Mbps network and 3 hours on a 100 Mbps network.

By "recovery time objective" is meant the maximum acceptable duration of the recovery to ensure the recovery of a virtual machine after the occurrence of a disaster.

The site recovery manager module SRM is for example the site recovery manager SRM from VMware.

The site recovery manager module SRM is paired with the site recovery manager module SRM of the other site AS, PS corresponding to the same workload domain WLD.

The pairing allows the synchronization of the disaster recovery configuration information between the site recovery manager module SRM of the workload domain WLD in one of the sites AS, PS and the site recovery manager module SRM of the same workload domain WLD in the other site AS, PS.

In FIG. 1, the site recovery manager module SRM of the first workload domain WLD in the active site AS is paired with the site recovery manager module SRM of the first workload domain WLD in the passive site PS and the site recovery manager module SRM of the second workload domain WLD in the active site AS is paired with the site recovery manager module SRM of the second workload domain WLD in the passive site PS, each pairing being represented by a double dotted arrow.

The management domain further comprises a cloud orchestrator CO configured to update disaster recovery configuration information comprised in at least one site recovery manager module SRM on user request.

The cloud orchestrator is for example the vRealize® Orchestrator™ from VMware.

The management domain further comprises a cloud proxy CP configured to receive user requests from the public cloud PC via the external communication network CN and especially disaster recovery configuration requests comprising a group of disaster recovery configuration information to update.

The cloud proxy is also configured to send the received disaster recovery configuration requests to the cloud orchestrator CO.

The management domain can further comprise a management domain storage management module MSM configured to manage the computing and storage resources of the management domain.

The management domain storage management module MSM is for example a VMware vSAN™ module.

Each site AS, PS comprises at least one internal communication network configured to allow communication within the site AS, PS.

In a first embodiment represented in FIG. 1, each site AS, PS comprises an internal management communication network MN and an internal replication communication network RN.

The internal management communication network MN is configured to allow communication within the management domain and between the management domain and each workload domain WLD and the internal replication communication network RN is configured to allow transmission of the replicated storage resources to the other site AS, PS.

In a second embodiment, each site AS, PS comprises a unique internal communication network to allow communication within the management domain and between the management domain and each workload domain WLD and to allow transmission of the replicated storage resources to the other site AS, PS.

A second aspect of the invention relates to a method for the automatic deployment of the computing infrastructure INF according to the invention.

In the invention, the passive site PS is deployed as an active site, and disaster recovery is layered on top of the deployed active and passive sites through the public and private clouds, and through the cloud orchestrator. Thanks to this, the active and passive sites can be deployed at different times, as users generally want to focus on the active site first.

Furthermore, automating the disaster recovery integration during the deployment phase would introduce pre-requisites which could stall the active deployment, causing frustration to a user. The invention is thus easier to deploy. The way the system is deployed also gives flexibility for a user to "convert" an active deployment into a passive deployment at a later stage. This also allows users to deploy and use Virtual Machines onto the passive site PS and have a full Hybrid Cloud experience. Furthermore, active and passive sites can be exchangeable, that is an active site at some point of its lifetime could become a passive site and vice versa. No Active Directory synchronization is required and DNS and NTP can be configured as per a normal deployment of Hybrid Cloud.

To be able to deploy the active and passive sites first, the management stack on each site is standalone with no synchronization between the two management stacks. The management stack comprises all management modules comprised in the management domain. This means no unnecessary management footprint with regards to disaster recovery infrastructure is introduced, reducing the power consumption and network use of the invention.

Figure 4:
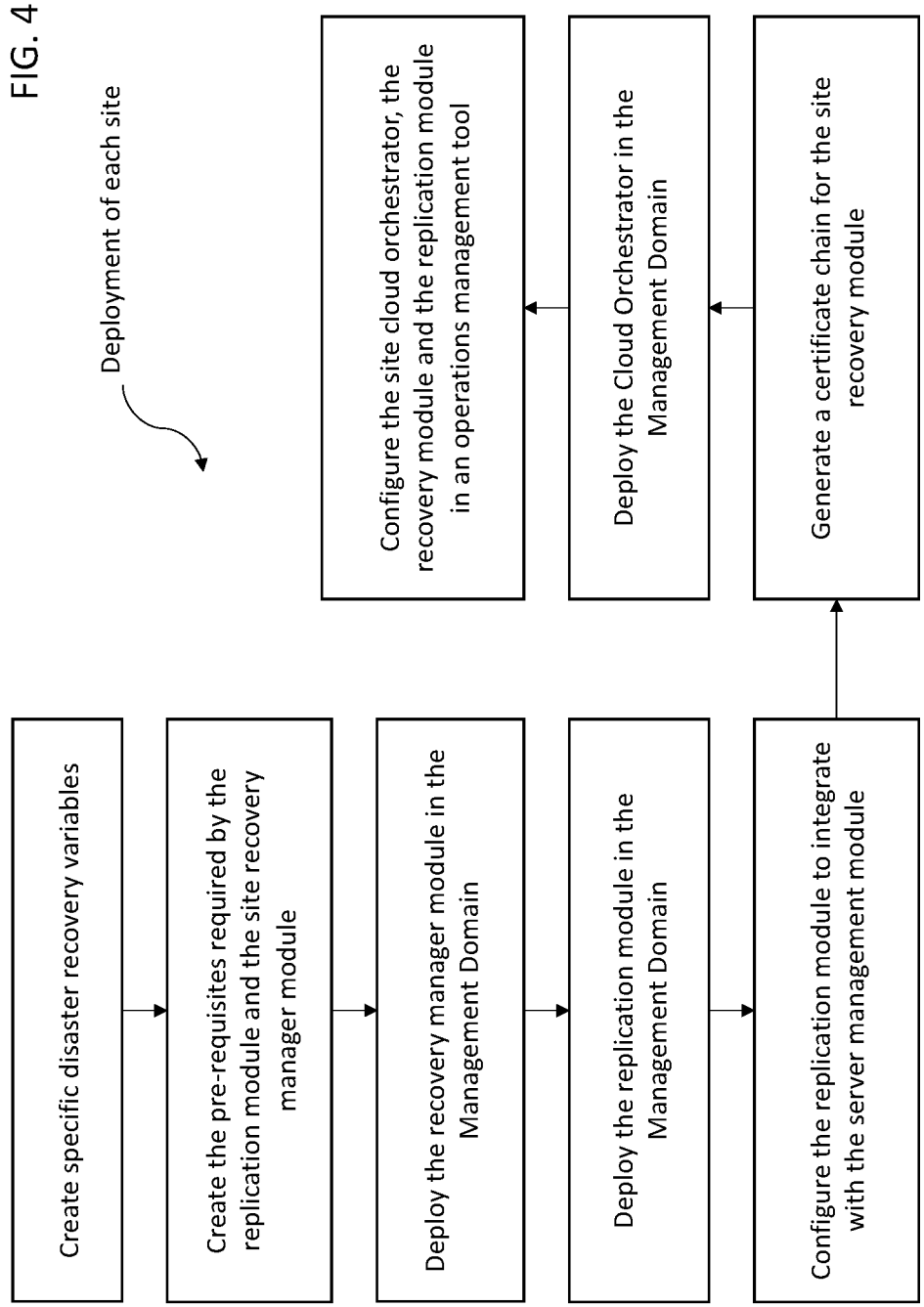
FIG. 4 represents the method for the deployment of the system, which is carried out using an automation tool.

The method for the deployment of the system is represented at FIG. 4.

This method is carried out using an automation tool such as Ansible®. The automation tool used should use models for the automation of tasks, such as Ansible® playbooks. The method described here can be implemented by being described in models such as Ansible® playbooks. The Ansible playbooks comprise tasks which are described here as steps. The Ansible playbooks can be stored in a dedicated database or retrieved through a network.

The automatic deployment method represented at FIG. 4 is carried out for each of the active site AS and passive site PS and comprises a first step "createDrVars" of creating specific disaster recovery variables used during disaster recovery integration automation. These variables include, but are not limited to:
  vlan: VLAN of the replication network,
  pgName: The name of the replication port group which is used for traffic isolation between the management network and the workload network,
  gw: The default gateway of the replication network,
  cidr: The CIDR (Classless Inter-Domain Routing) of the replication network,
  netmask: The netmask of the replication network.

These variables are asked to the user once, for example using a form on a screen, the user having a knowledge of its infrastructure. The specific disaster recovery variables are predefined, for example by being stored in a dedicated database or retrieved through a network, and a value of each variable is therefore provided by a user using a human-machine interface.

Therefore, an example of these variables can read as follows:
  drActivePassive: vlan: "36" pgName: "PortGroupReplication" gw: "2" #vRepNetwork: "172.12.4" cidr:"172.12.4" netmask: "255.255.255.0".

A second step "createDrPrereqs" creates the pre-requisites required by the replication module RM and the site recovery manager module SRM. These include for example Active Directory accounts, networking layer VMKernels and PortGroups for replication traffic, NSX-T distributed firewall configuration, site recovery management module SRM service accounts creation, role-based access configuration RBAC on the server management module MM.

A third step "createSrm" automatically deploys an Open Virtual Appliance (OVA) file of the recovery manager module SRM in the Management Domain.

A fourth step "createVsphereReplication" automatically deploys an Open Virtual Appliance (OVA) file of the replication module RM in the Management Domain and adds a second network interface NIC to the Replication Portgroup. This permits to automatically deploy the replication Module RM on the management network of each site.

A fifth step "configureVsphereReplication" automatically configures the replication module RM to integrate with the server management module MM.

A sixth step "configureSrmCertificates" automatically generates a certificate chain for the site recovery module SRM.

A seventh step "createVro" automatically deploys an Open Virtual Appliance (OVA) file of the Cloud Orchestrator in the Management Domain.

An eighth step "configureVrops" automatically configures the cloud orchestrator, the site recovery module SRM and the replication module RM in an operations management tool of the Public Cloud that monitors physical, virtual, and cloud infrastructures, such as vRealize® Operations.

All these steps are repeated for each site, that is, once for the active site AS and once for the passive site PS.

All the open virtual appliance (OVA) files are stored in a dedicated database or retrieved through a network and are predefined.

Once both sites have been automatically deployed, the manual tasks are related to deploying the cloud solution.

Thanks to the invention, the only manual tasks to be performed, which are accessible to non trained users who only have a knowledge of how to use the public cloud PC solution, are:
  Pair the site recovery modules SRM of each site with its server management module MM,
  Create Customer Protection Group and Recovery Plan,
  Configure a cloud orchestrator disaster recovery workflow as a function of the user's needs.

A third aspect of the invention relates to a method for configuring disaster recovery in the computing infrastructure INF according to the invention.

Figure 2:
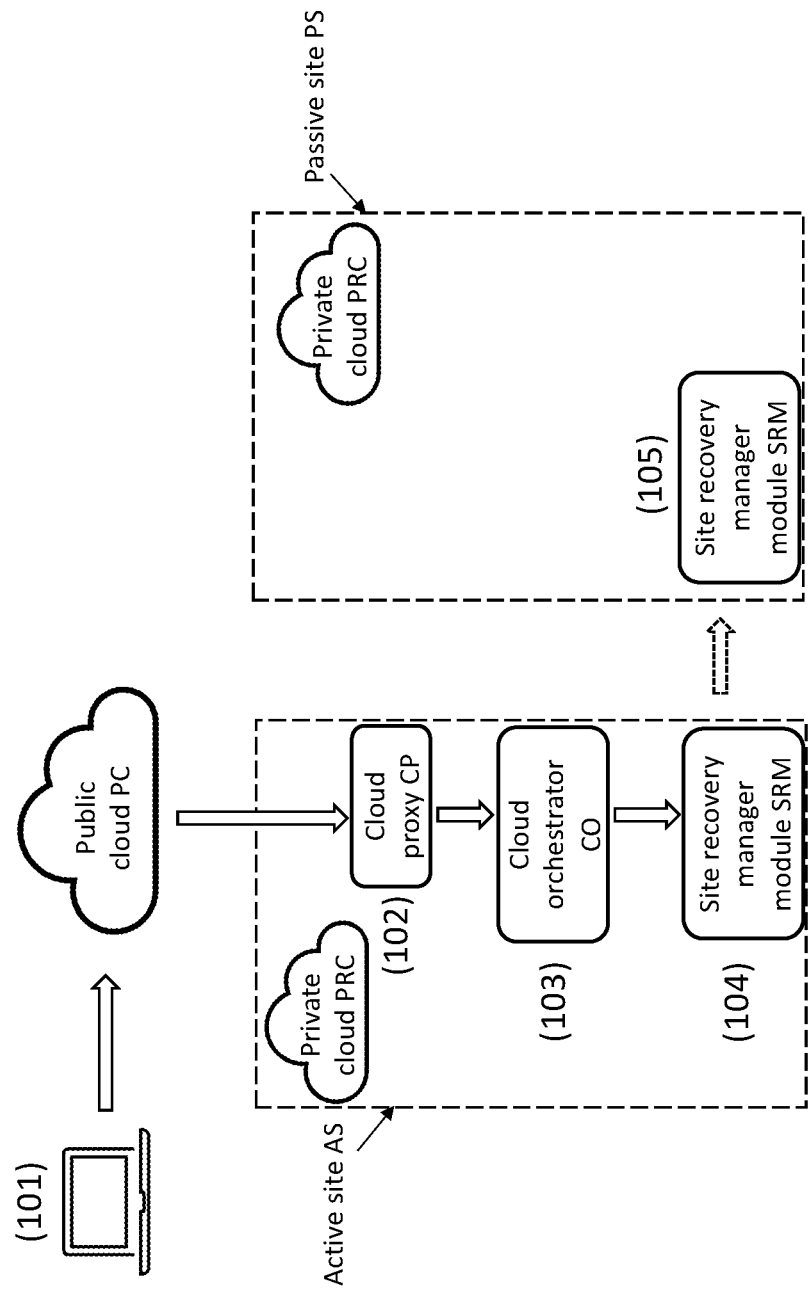
FIG. 2 is a flow chart of a method according to the invention.

The sequence of steps of the method 100 according to the invention is represented in FIG. 2.

Figure 3:
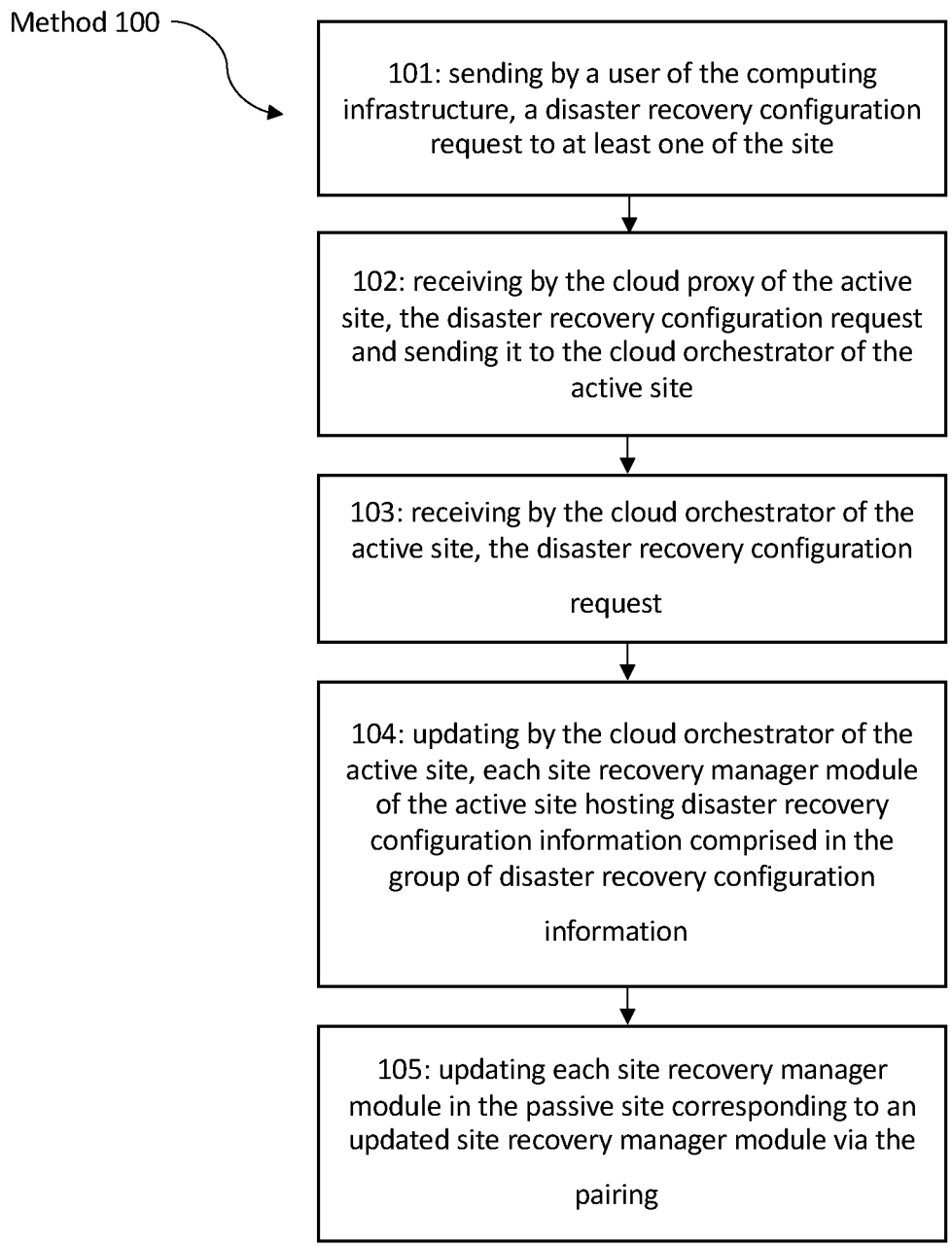
FIG. 3 schematically represents an example of implementation of the steps of the method according to the invention in the computing infrastructure according to the invention.

An example of implementation of the method 100 according to the invention in the computing infrastructure INF according to the invention is represented in FIG. 3.

In FIG. 3, only the elements of the architecture of the active site AS and of the passive site PS implied in the example of implementation of the method 100 according to the invention are represented for the sake of simplicity.

A first step 101 of the method 100 according to the invention consists for a user of the computing infrastructure INF in sending a disaster recovery configuration request to at least one of the site AS, PS.

In the reminder of the description, it is considered that the disaster recovery configuration request is sent to the active site AS as represented in FIG. 3.

As represented in FIG. 3, the disaster recovery configuration request is sent to the active site AS via the public cloud PC, that is that the disaster recovery configuration request is sent to the public cloud PC and then sent from the public cloud PC to the active site AS via the external communication network CN.

The disaster recovery configuration request comprises a group of disaster recovery configuration information to update.

The group of disaster recovery configuration information comprises at least one piece of disaster recovery configuration information, for example a group of protected virtual machines and a recovery plan to update.

A second step 102 of the method 100 according to the invention consists for the cloud proxy CP of the active site AS in receiving the disaster recovery configuration request. The second step 102 of the method 100 according to the invention consists then for the cloud proxy CP of the active site AS in sending the disaster recovery configuration request to the cloud orchestrator CO of the active site AS.

A third step 103 of the method 100 according to the invention consists for the cloud orchestrator CO of the active site AS in receiving the disaster recovery configuration request.

A fourth step 104 of the method 100 according to the invention consists for the cloud orchestrator CO of the active site AS in updating each site recovery manager module SRM of the active site AS hosting disaster recovery configuration information comprised in the group of disaster recovery configuration information.

A fifth step 105 of the method 100 according to the invention consists in updating each site recovery manager module SRM in the passive site PS corresponding to a site recovery manager module SRM updated at the fourth step 104 via the pairing.

What is claimed is:

1. A computing infrastructure configured to implement an automatic active-passive disaster recovery, comprising:
  one active site and one passive site, wherein each site of said one active site and said one passive site comprises
    a private cloud connected via an external communication network to a public cloud and to the private cloud of the other site of said one active site and said one passive site;
  at least one workload domain comprising
    at least one virtual machine associated with computing and storage resources, configured to host workloads, each virtual machine of said at least one virtual machine having a placeholder virtual machine in said other site; and
    a replication module configured to replicate the computing and storage resources associated with said each virtual machine comprised in a group of protected virtual machines in the computing and storage resources associated with said placeholder virtual machine in said other site;
  a management domain configured to control each workload domain of said at least one workload domain, comprising
    one server management module per said at least one workload domain, configured to control said each virtual machine comprised in the at least one workload domain;
    one site recovery manager module per said at least one workload domain, paired with a corresponding site recovery manager module in said each site, configured to synchronize disaster recovery configuration information comprising one or more protected virtual machines and at least one recovery plan to recover each virtual machine comprised in the group of protected virtual machines via pairing of said one site recovery manager module with said corresponding site recovery manager module, and to automatically execute each recovery plan of said at least one recovery plan in a case of a disaster;

a cloud orchestrator configured to, upon receipt of a disaster recovery configuration request for updating a group of said disaster recovery configuration information, update each site recovery manager module hosting said disaster recovery configuration information comprised in the group of said disaster recovery configuration information; and a cloud proxy configured to receive disaster recovery configuration requests from the public cloud via the external communication network and to send the disaster recovery configuration requests that are received to the cloud orchestrator;

wherein said each virtual machine in the one active site being run as long as no disaster occurs, and wherein said each virtual machine comprised in the group of protected virtual machines being run only in said case of said disaster in the one passive site.

2. The computing infrastructure according to claim 1, wherein the public cloud and the private cloud of said each site are connected via an Internet connection provided by the external communication network.

3. The computing infrastructure according claim 1 further comprising an internal management communication network configured to allow communication within the management domain and between the management domain and said each workload domain.

4. The computing infrastructure according to claim 1 further comprising an internal replication communication network configured to allow transmission of the computing and storage resources that are replicated to said each site.

5. The computing infrastructure according to claim 1 wherein the management domain further comprises a management domain storage management module configured to manage computing and storage resources of the management domain.

6. The computing infrastructure according to claim 1 wherein said each workload domain further comprises a workload domain storage management module configured to manage the computing and storage resources associated with said each virtual machine comprised in the each workload domain.

7. The computing infrastructure according to claim 1 wherein the disaster recovery configuration information comprises one of more of at least one recovery point objective and at least one recovery time objective for each group of protected virtual machines of said one or more protected virtual machines.

8. A method for configuring disaster recovery in a computing infrastructure configured to implement an automatic active-passive disaster recovery, said computing infrastructure comprising one active site and one passive site, wherein each site of said one active site and said one passive site comprises
a private cloud connected via an external communication network to a public cloud and to the private cloud of the other site of said one active site and said one passive site;
at least one workload domain comprising
at least one virtual machine associated with computing and storage resources, configured to host workloads, each virtual machine of said at least one virtual machine having a placeholder virtual machine in said other site; and
a replication module configured to replicate the computing and storage resources associated with said each virtual machine comprised in a group of protected virtual machines in the computing and storage resources associated with said placeholder virtual machine in said other site;

a management domain configured to control each workload domain of said at least one workload domain, comprising
one server management module per said at least one workload domain, configured to control said each virtual machine comprised in the at least one workload domain;
one site recovery manager module per said at least one workload domain, paired with a corresponding site recovery manager module in said each site, configured to synchronize disaster recovery configuration information comprising one or more protected virtual machines and at least one recovery plan to recover each virtual machine comprised in the group of protected virtual machines via pairing of said one site recovery manager module with said corresponding site recovery manager module, and to automatically execute each recovery plan of said at least one recovery plan in a case of a disaster;
a cloud orchestrator configured to, upon receipt of a disaster recovery configuration request for updating a group of said disaster recovery configuration information, update each site recovery manager module hosting said disaster recovery configuration information comprised in the group of said disaster recovery configuration information; and
a cloud proxy configured to receive disaster recovery configuration requests from the public cloud via the external communication network and to send the disaster recovery configuration requests that are received to the cloud orchestrator;

wherein said each virtual machine in the one active site being run as long as no disaster occurs, and wherein said each virtual machine comprised in the group of protected virtual machines being run only in said case of said disaster in the one passive site;

said method comprising:

sending, by a user of the computing infrastructure, said disaster recovery configuration request to at least one site of said one active site and said one passive site via the public cloud, the disaster recovery configuration request comprising said group of said disaster recovery configuration information to update;

receiving the disaster recovery configuration request by the cloud proxy of the at least one site, and sending the disaster recovery configuration request to the cloud orchestrator by said cloud proxy;

receiving, by the cloud orchestrator, of the at least one site, said disaster recovery configuration request from the cloud proxy;

updating, by the cloud orchestrator of the at least one site, of each of said one site recovery manager module of the at least one site hosting said disaster recovery configuration information comprised in the group of said disaster recovery configuration information; and for each of said one site recovery manager module per said at least one workload domain of the at least one site that is updated, updating the corresponding site recovery manager module in said other site via pairing of said one site recovery manager module with said corresponding site recovery manager module.

9. A method for automatic deployment of a site of one active site and one passive site of a computing infrastructure, said computing infrastructure configured to implement an automatic active-passive disaster recovery, said computing infrastructure comprising said one active site and said one passive site, wherein each site of said one active site and said one passive site comprises
a private cloud connected via an external communication network to a public cloud and to the private cloud of the other site of said one active site and said one passive site;
at least one workload domain comprising
at least one virtual machine associated with computing and storage resources, configured to host workloads, each virtual machine of said at least one virtual machine having a placeholder virtual machine in said other site; and
a replication module configured to replicate the computing and storage resources associated with said each virtual machine comprised in a group of protected virtual machines in the computing and storage resources associated with said placeholder virtual machine in said other site;
a management domain configured to control each workload domain of said at least one workload domain, comprising
one server management module per said at least one workload domain, configured to control said each virtual machine comprised in the at least one workload domain;
one site recovery manager module per said at least one workload domain, paired with a corresponding site recovery manager module in said each site, configured to synchronize disaster recovery configuration information comprising one or more protected virtual machines and at least one recovery plan to recover each virtual machine comprised in the group of protected virtual machines via pairing of said one site recovery manager module with said corresponding site recovery manager module, and to automatically execute each recovery plan of said at least one recovery plan in a case of a disaster;
a cloud orchestrator configured to, upon receipt of a disaster recovery configuration request for updating a group of said disaster recovery configuration information, update each site recovery manager module hosting said disaster recovery configuration information comprised in the group of said disaster recovery configuration information; and
a cloud proxy configured to receive disaster recovery configuration requests from the public cloud via the external communication network and to send the disaster recovery configuration requests that are received to the cloud orchestrator;
wherein said each virtual machine in the one active site being run as long as no disaster occurs, and wherein said each virtual machine comprised in the group of protected virtual machines being run only in said case of said disaster in the one passive site;
said method comprising:
creating specific disaster recovery variables, the specific disaster recovery variables being predefined and a value of each variable of said specific disaster recovery variables being provided by a user using a human-machine interface,
creating pre-requisites required by the replication module to be deployed on the each site and the one site recovery manager module to be deployed on the each site, the pre-requisites comprising at least one of
Active Directory accounts,
networking layer VMKernel,
Port Groups for replication traffic,
distributed firewall configuration,
site recovery management module service accounts,
role-based access configuration on the one server management module,
deploying the one site recovery manager module in the management domain of the each site,
deploying the replication module in the management domain of the each site,
configuring the replication module of the each site to integrate with the one server management module of the each site,
generating a certificate chain for the one site recovery manager module,
deploying the cloud orchestrator in the management domain of the each site,
configuring the cloud orchestrator, the one site recovery manager module and the replication module in an operations management tool of the public cloud of the computing infrastructure.

10. The method of claim 9, further comprising
first deploying the one active site, then deploying the one passive site, and then configuring disaster recovery in the computing infrastructure by
sending, by a user of the computing infrastructure, said disaster recovery configuration request to at least one site of the one active site and the one passive site via the public cloud, the disaster recovery configuration request comprising a group of disaster recovery configuration information to update;
receiving the disaster recovery configuration request by the cloud proxy of the at least one site, and sending the disaster recovery configuration request, by said cloud proxy, to the cloud orchestrator of said at least one site;
receiving, by the cloud orchestrator, said disaster recovery configuration request from the cloud proxy;
updating, by the cloud orchestrator, of each of said one site recovery manager module per said at least one workload domain of said at least one site hosting said disaster recovery configuration information comprised in the group of said disaster recovery configuration information; and
for each of said one site recovery manager module per said at least one workload domain of the at least one site that is updated, updating a corresponding site recovery manager module in said other site of the one active site and the one passive site via pairing of said one site recovery manager module with said corresponding site recovery manager module.

* * * * *